United States Patent
Park et al.

(10) Patent No.: US 12,030,487 B2
(45) Date of Patent: Jul. 9, 2024

(54) SYSTEM PREVENTING COLLISION OF VEHICLE AND METHOD OF CONTROLLING THE SAME

(71) Applicants: HYUNDAI MOTOR COMPANY, Seoul (KR); KIA CORPORATION, Seoul (KR)

(72) Inventors: Jonghyeok Park, Seosan-si (KR); Byeong Hyeok Min, Hwaseong-si (KR); Hyungmin Ko, Suwon-si (KR); Taeyoung Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 435 days.

(21) Appl. No.: 17/228,857

(22) Filed: Apr. 13, 2021

(65) Prior Publication Data

US 2022/0073064 A1    Mar. 10, 2022

(30) Foreign Application Priority Data

Sep. 9, 2020    (KR) .................. 10-2020-0115567

(51) Int. Cl.
*B60W 30/095*    (2012.01)
*B60W 10/18*    (2012.01)
(Continued)

(52) U.S. Cl.
CPC ........ *B60W 30/0956* (2013.01); *B60W 10/18* (2013.01); *B60W 10/20* (2013.01);
(Continued)

(58) Field of Classification Search
CPC .. B60W 30/0956; B60W 10/18; B60W 10/20; B60W 30/09; B60W 50/0097;
(Continued)

(56) References Cited

U.S. PATENT DOCUMENTS

2019/0100197 A1* 4/2019 Saiki ..................... B60W 10/20

FOREIGN PATENT DOCUMENTS

JP    2003-208221 A    7/2003
JP    2008-189087 A    8/2008
(Continued)

OTHER PUBLICATIONS

Yang, Bo, HuanHuan Zhang, and ZhongShun Jiang. "Path Planning and Tracking Control for Automatic Driving Obstacle Avoidance." Proceedings of the 2019 International Conference on Robotics, Intelligent Control and Artificial Intelligence. 2019. (Year: 2019).*

(Continued)

*Primary Examiner* — Russell Frejd
*Assistant Examiner* — Ana D Thomas
(74) *Attorney, Agent, or Firm* — Morgan, Lewis & Bockius LLP

(57) ABSTRACT

A vehicle includes: a detection sensor configured to acquire a front view of the vehicle, and configured to detect an obstacle in the front view; and a controller including at least one processor which is configured to process data obtained from the detection sensor. The controller may be configured to determine a predicted position of a collision between the vehicle and the obstacle, determine an avoidance position capable of avoiding a collision with the obstacle based on the collision prediction position, generate a plurality of avoidance paths corresponding to a plurality of predetermined conditions, respectively, based on the avoidance position, and control a steering angle adjustment unit to follow any one of the plurality of avoidance paths.

16 Claims, 18 Drawing Sheets

(51) Int. Cl.
*B60W 10/20* (2006.01)
*B60W 30/09* (2012.01)
*B60W 50/00* (2006.01)

(52) U.S. Cl.
CPC ........ *B60W 30/09* (2013.01); *B60W 50/0097* (2013.01); *B60W 2420/403* (2013.01); *B60W 2520/06* (2013.01)

(58) Field of Classification Search
CPC ......... B60W 2420/42; B60W 2520/06; B60W 2554/402; B60W 2554/4029; B60W 30/095; B60W 2552/50
See application file for complete search history.

(56) References Cited

FOREIGN PATENT DOCUMENTS

| | | |
|---|---|---|
| JP | 2017-043262 A | 3/2017 |
| JP | 2017-206182 A | 11/2017 |
| JP | 2019-064336 A | 4/2019 |
| JP | 2019-131149 A | 8/2019 |
| KR | 10-2016-0056561 A | 5/2016 |
| KR | 10-2016-0056711 A | 5/2016 |
| KR | 10-2021-0000994 A | 1/2021 |
| KR | 10-2021-0029867 A | 3/2021 |

OTHER PUBLICATIONS

González, David, et al. "Continuous curvature planning with obstacle avoidance capabilities in urban scenarios." 17th International IEEE Conference on Intelligent Transportation Systems (Itsc). IEEE, 2014. (Year: 2014).*
Korean Office Action dated Oct. 20, 2021 issued in Korean Patent Application No. 10-2020-0115567.
Korean Notice of Allowance issued in Application No. 10-2020-0115567 dated Feb. 23, 2022 (with English translation).

* cited by examiner

SYSTEM PREVENTING COLLISION OF VEHICLE AND METHOD OF CONTROLLING THE SAME

CROSS-REFERENCE TO RELATED APPLICATION(S)

This application claims the benefit of Korean Patent Application No. 10-2020-0115567, filed on Sep. 9, 2020 in the Korean Intellectual Property Office, the entire contents of which are incorporated by reference herein.

TECHNICAL FIELD

The present disclosure relates to a vehicle and a control method thereof, more particularly, to a vehicle and a control method for naturally avoiding an obstacle and preventing a secondary collision after the avoidance.

BACKGROUND

Recently, in order to reduce a burden on a driver and improve convenience, an Advanced Driver Assist System (ADAS) that actively provides information on the vehicle status, driver status, and surrounding environment has been actively developed.

Examples of the ADAS include Smart Cruise Control System, Lane Keeping Assist System, Lane Following Assist, Lane Departure Warning System, Forward Collision Avoidance (FCA), Forward Collision-Avoidance Assist-Lane-Change Side (FCA-LS), Forward Collision-Avoidance Assist-Lane-Change Oncoming (FCA-LO), Forward Collision-Avoidance Assist with Evasive Steering Assis (FCA w/ESA). Such a system determines a risk of collision with an opposing vehicle or an intersecting vehicle in the driving situation of the vehicle, avoids a collision through emergency braking, and controls the vehicle to travel while maintaining a gap with the vehicle in front, or assists in preventing to not deviate from the driving lane.

The information included in this Background section is only for enhancement of understanding of the general background of the present disclosure and may not be taken as an acknowledgement or any form of suggestion that this information forms the prior art already known to a person skilled in the art.

SUMMARY

The present disclosure provides a vehicle and a vehicle control method capable of responding to all collision risk situations existing in all directions of an own vehicle.

In accordance with an aspect of the present disclosure, a vehicle may comprise a detection sensor configured to acquire a front view of the vehicle, and configured to detect an obstacle in the front view; and a controller including at least one processor processes data obtained from the detection sensor. The controller may be configured to determine a predicted position of a collision between the vehicle and the obstacle, determine an avoidance position capable of avoiding a collision with the obstacle based on the collision prediction position, generate a plurality of avoidance paths corresponding to a plurality of predetermined conditions, respectively, based on the avoidance position, and control a steering angle adjustment unit to follow any one of the plurality of avoidance paths.

The controller may be configured to calculate a target position at which a tracking of the avoidance path is ended based on a predetermined condition, and generate the plurality of avoidance paths based on the target position.

The vehicle may further comprise a storage configured to store a plurality of predetermined conditions and a plurality of avoidance paths corresponding to the predetermined conditions.

The controller may be configured to generate the plurality of avoidance paths including a path in which a longitudinal position of the vehicle is larger than the longitudinal position of the obstacle and a curvature is gentle, and a path in which the longitudinal position of the vehicle is the same as the longitudinal position of the obstacle and the curvature is steep.

The controller may be configured to control the plurality of avoidance paths not to follow when the width of the front bumper of the vehicle is greater than the distance between the obstacle and each of the lanes on both sides.

The controller may be configured to perform braking control so as to not to collide with the obstacle.

The controller may be configured to generate the plurality of avoidance paths using coefficients of the fifth-order function.

The controller may be configured to obtain an offset of the vehicle using the fifth-order function, obtain the heading angle of the vehicle using a fourth-order function obtained by differentiating the fifth-order function, and obtain the curvature of the avoidance path using a cubic function obtained by differentiating the fourth-order function.

The avoidance path includes a first avoidance path for a first section and a second avoidance path for a second section, and the first avoidance path is a path for avoiding a first obstacle, and the second avoidance path is a path for avoiding a second obstacle after the first obstacle.

The controller may be configured to determine the first avoidance path as a path having a gentle, and control a steering angle adjustment unit to follow the gentle path in the first section when there is no risk of collision with the second obstacle.

The controller may be configured to perform at least one of braking control and steering control in the second avoidance path when there is a risk of collision with the second obstacle.

In accordance with another aspect of the present disclosure, a method of controlling a vehicle includes: determining a collision prediction position between the vehicle and obstacle; determining an avoidance position capable of avoiding a collision with the obstacle based on the collision prediction position; generating a plurality of avoidance paths corresponding to a plurality of predetermined conditions, respectively, based on the avoidance position; and controlling the vehicle to follow any one of the plurality of avoidance paths.

Generating the plurality of avoidance paths may comprise calculating a target position at which a tracking of the avoidance path is ended based on a predetermined condition, and generating the plurality of avoidance paths based on the target position.

The method may further comprise loading the plurality of predetermined conditions and a plurality of avoidance paths corresponding to the predetermined conditions from a storage.

Generating the plurality of avoidance paths may comprise generating the plurality of avoidance paths including a path in which a longitudinal position of the vehicle is larger than the longitudinal position of the obstacle and a curvature is gentle, and a path in which the longitudinal position of the vehicle is the same as the longitudinal position of the obstacle and the curvature is steep.

Controlling the vehicle may comprise controlling the plurality of avoidance paths not to follow when the width of the front bumper of the vehicle is greater than the distance between the obstacle and each of the lanes on both sides.

Controlling the vehicle may comprise performing braking control so as to not to collide with the obstacle.

Generating the plurality of avoidance paths may comprise generating the plurality of avoidance paths using coefficients of the fifth-order function.

Generating the plurality of avoidance paths may comprise obtaining an offset of the vehicle using the fifth-order function, obtaining the heading angle of the vehicle using a fourth-order function obtained by differentiating the fifth-order function, and obtaining the curvature of the avoidance path using a cubic function obtained by differentiating the fourth-order function.

A non-transitory computer program stored on a recording medium, may comprise steps of determining a collision prediction position between the vehicle and obstacle; determining an avoidance position capable of avoiding a collision with the obstacle based on the collision prediction position; generating a plurality of avoidance paths corresponding to a plurality of predetermined conditions, respectively, based on the avoidance position; and controlling the vehicle to follow any one of the plurality of avoidance paths.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
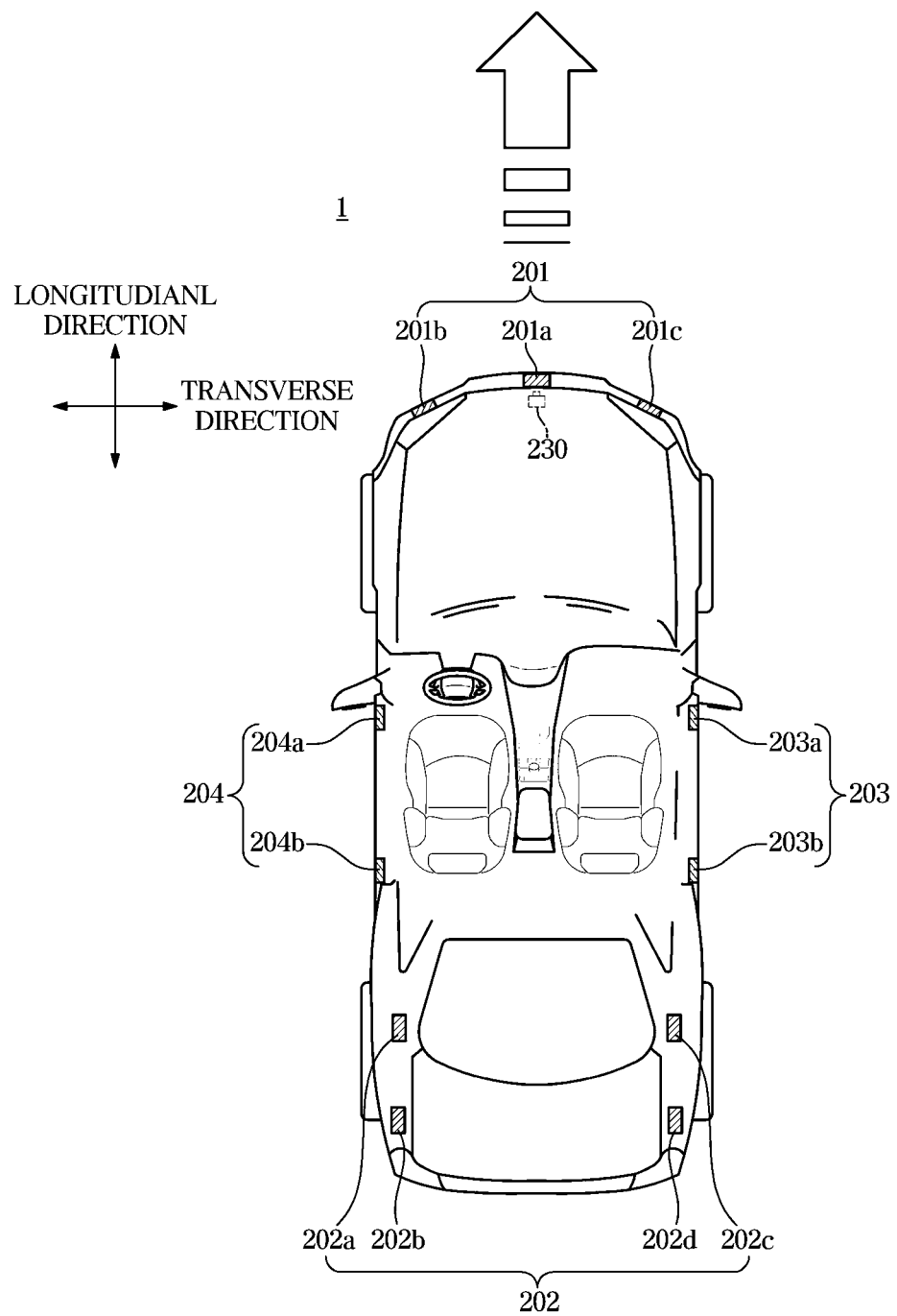
FIG. 1 illustrates a vehicle provided with a plurality of detection sensors and a lane detector according to an embodiment of the present disclosure.

The same reference numerals refer to the same elements throughout the specification. This specification does not describe all elements of the embodiments, and general content in the technical field to which the present disclosure pertains or overlapping content between the embodiments will be omitted. The term 'unit, module, member, block' used in the specification may be implemented in software or hardware, and a plurality of 'units, modules, members, blocks' may be implemented as a single component according to embodiments, it is also possible for one 'unit, module, member, block' to include a plurality of components.

Throughout the specification, when a part is said to be "connected" with another part, this includes not only the case of being directly connected, but also the case of being indirectly connected, and the indirect connection includes being connected through a wireless communication network.

In addition, when a part "includes" a certain component, it means that other components may be further included rather than excluding other components unless specifically stated to the contrary.

Throughout the specification, unless explicitly described to the contrary, the word "comprise" and variations such as "comprises" or "comprising" will be understood to imply the inclusion of stated elements but not the exclusion of any other elements.

Throughout the specification, when a member is said to be located "on" another member, this includes not only the case where the member is in contact with the other member, but also the case where another member exists between the two members.

Terms such as first and second are used to distinguish one component from other components, and the component is not limited by the above-described terms.

Singular expressions include plural expressions, unless the context clearly has exceptions.

In each step, the identification code is used for convenience of explanation, and the identification code does not describe the order of each step, and each step may be performed differently from the specified order unless a specific sequence is clearly stated in the context.

In addition, 'obstacle' in the present specification refers to all objects that may collide with a vehicle, and includes moving objects such as other vehicles, pedestrians, and cyclists, as well as non-moving objects such as trees and street lights.

Hereinafter, an operating principle and embodiments of the present disclosure will be described with reference to the accompanying drawings.

FIG. 1 illustrates a vehicle provided with a plurality of detection sensors and a lane detector according to an embodiment of the present disclosure.

For convenience of description below, in general, a direction in which a vehicle 1 moves forward or backward is referred as a longitudinal direction, and the left and right are divided based on the front-side. In addition, when the front is the 12 o'clock direction, the 3 o'clock direction and the 9 o'clock direction are respectively defined as horizontal directions.

Referring to FIG. 1, the vehicle 1 may be provided with a plurality of detection sensors 200 that detect an obstacle located around the vehicle 1 and acquire at least one of the detected position information or driving speed information of the obstacle.

At least one of position information or speed information of an obstacle positioned around the vehicle 1 may be obtained based on the vehicle 1. That is, the detection sensor 200 may acquire coordinate information that changes as the obstacle moves in real time, and may detect a distance between the vehicle 1 and the obstacle.

As will be described later, the controller 100 (refer to FIG. 2) uses the position information and speed information of the obstacle acquired by the detection sensor 200 to calculate the relative distance between the vehicle 1 and the obstacle and the relative speed between the vehicle 1 and the obstacle, and calculate an expected collision time (Time To Collision, TTC) between the vehicle 1 and the obstacle based on relative distance and speed.

As shown in FIG. 1, the detection sensor 200 may be installed in an appropriate position capable of recognizing an object, for example, another vehicle in the front, side or front-side. According to an embodiment, the detection sensor 200 may be installed in the front, left and right sides of the vehicle 1 in order to recognize objects located in all directions such as the front of the vehicle 1, between the left side and the front of the vehicle 1 (hereinafter, left front side), between the right side and the front of the vehicle 1 (hereinafter, right front side).

For example, a first detection sensor 201a may be installed inside a part of the radiator grille, for example, and may be installed at any position of the vehicle 1 if it is a position capable of detecting a vehicle positioned in front. In one embodiment of the present disclosure, a case where the first detection sensor 201a is provided in the center of the front of the vehicle 1 will be described as an example. In addition, a second detection sensor 201b may be provided on the left side of the front of the vehicle 1, and a third detection sensor 201c may be provided on the right side of the front of the vehicle 1.

The detection sensor 200 includes a rear side detection sensor 202 that detects pedestrians or other vehicles that exist in the rear, lateral side, or a direction (hereinafter referred to as rear-side) of the vehicle 1 or approach in this direction. The rear side detection sensor 202 may be installed at an appropriate position capable of recognizing a side, rear, or rear side object, for example, another vehicle, as shown in FIG. 1.

Figure 2:
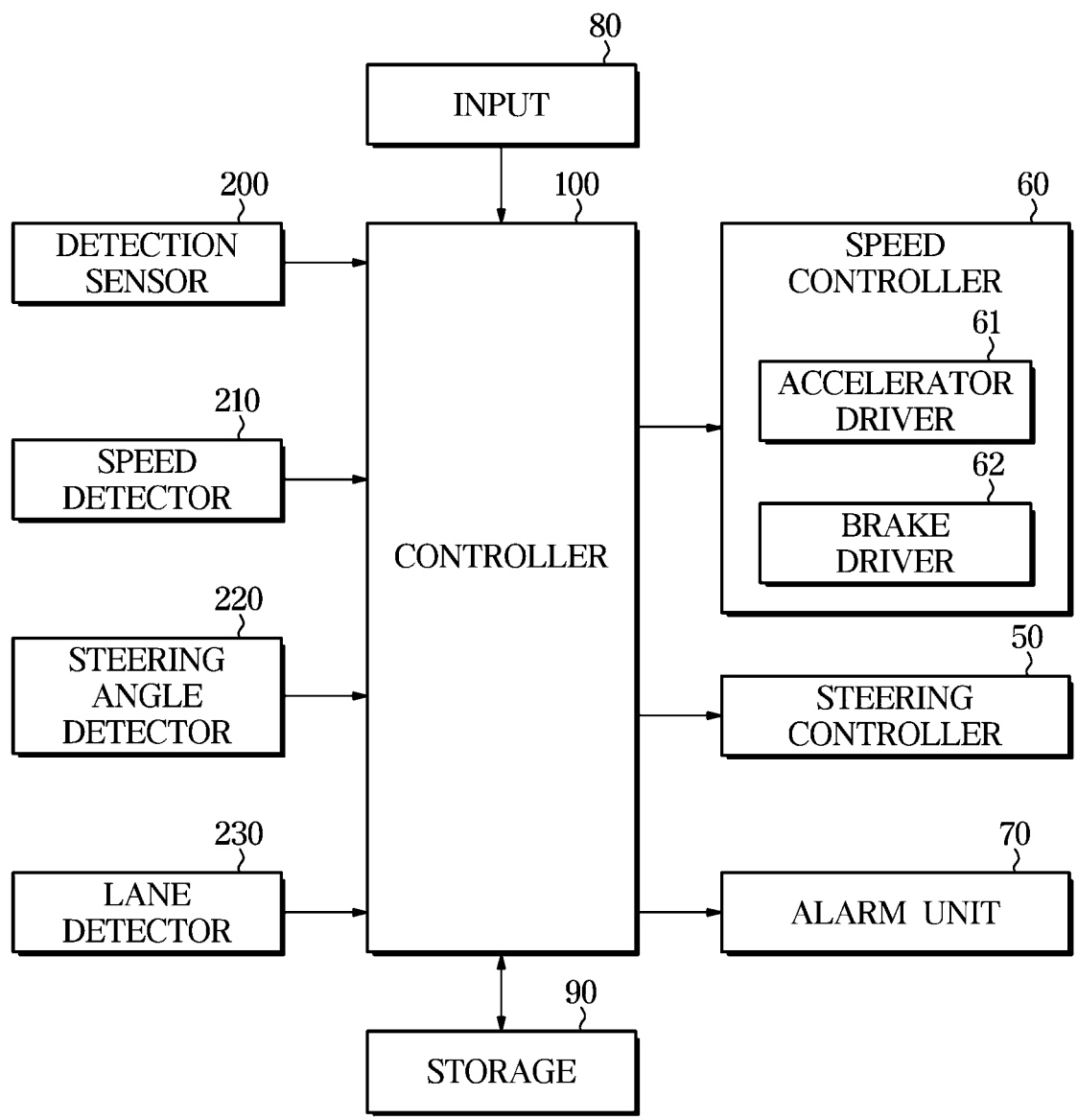
FIG. 2 is a control block diagram of a vehicle according to an exemplary embodiment of the present disclosure.

Referring to FIG. 2, the vehicle 1 includes a speed controller 60 that adjusts a driving speed of the vehicle 1 that the driver drives, a steering controller 50 that adjusts a steering angle of the vehicle 1, a speed detector 210 that detects the driving speed of the vehicle 1, a steering angle detector 220 for detecting the rotation angle of the steering wheel, a lane detector 230 for detecting the shape of the lane or road on which the vehicle 1 is running, a storage 90 for storing data related to the control of the vehicle 1, a controller 100 that controls each component of the vehicle 1 and controls the driving speed and steering angle of the vehicle 1, an alarm unit 70 that transmits information to the driver in relation to the operation and driving of the vehicle 1, and an input 80 to receive commands related to vehicle control.

The speed controller 60 may adjust the speed of the vehicle 1 driven by the driver. The speed controller 60 may include an accelerator driver 61 and a brake driver 62.

The accelerator driver 61 increases the speed of the vehicle 1 by driving the accelerator by receiving a control signal from the controller 100, and the brake driver 62 may reduce the speed of the vehicle 1 by driving a brake by receiving a control signal from the controller 100.

The speed controller 60 can adjust the driving speed of the vehicle 1 under the control of the controller 100. When the risk of collision between the vehicle 1 and other obstacles is high, the driving speed of the vehicle 1 may be reduced.

The steering controller 50 may adjust a steering angle of the vehicle 1 driven by the driver. Specifically, the steering controller 50 may adjust the steering angle of the vehicle 1 by adjusting the rotation angle of the steering wheel of the vehicle 1 under the control of the controller 100. The steering controller 50 may change the steering angle of the vehicle 1 when the risk of collision between the vehicle 1 and other obstacles is high.

The speed detector 210 may detect the driving speed of the vehicle 1 driven by the driver under the control of the controller 100. That is, the driving speed can be detected using the speed at which the wheel of the vehicle 1 rotates.

The unit of the driving speed can be expressed as [kph], and can be expressed as the distance traveled per unit time (h) (km).

The steering angle detector 220 may detect a steering angle, which is a rotation angle of the steering wheel, while the vehicle 1 is traveling. That is, when the vehicle 1 avoids surrounding obstacles through steering while driving, the controller 100 may control the steering of the vehicle 1 based on the steering angle detected by the steering angle detector 220.

The lane detector 230 is implemented as a video sensor such as a camera and mounted in front of the vehicle 1, detects a lane in which the vehicle 1 is running, and transmits it to the controller 100. In the photographed image acquired from the lane detector 230, information on how far the vehicle 1 is from the lane, information on how curved the lane or road is, information on how far the direction of the vehicle 1 is from the lane, etc. are included.

The lane detector 230 may acquire information on a distance to a lane, a curvature of a driving road, and a lane departure angle, and transmit the information to the controller 100.

The storage 90 may store various data related to the control of the vehicle 1. Specifically, information on a driving speed, a driving distance, and a driving time of the vehicle 1 according to an exemplary embodiment may be stored. In addition, the storage 90 may store position information and speed information of the obstacle detected by the detection sensor 200, and coordinate information changed in real time of the moving obstacle, and information about the relative distance and relative speed between the vehicle 1 and the obstacle.

In addition, the storage 90 may store a predetermined area within the driving lane of the vehicle 1. In addition, the storage 90 may store data related to an equation and a control algorithm for controlling the vehicle 1 according to an embodiment of the present disclosure, and may transmit a control signal for controlling the vehicle 1 according to such an equation and a control algorithm.

In addition, the storage 90 may store information on a steering avoidance path set to avoid a collision with a target vehicle ob1 located in the lane next to the vehicle 1 and return to the driving lane, and may store information on the rotation angle of the steering wheel obtained by the steering angle detector 220.

In addition, as will be described later, the storage 90 may store first to fifth conditions for a target location for generating the avoidance path. In addition, the storage 90 may store an equation for calculating a target position corresponding to the first avoidance path and the target position corresponding to the second avoidance path according to the first to fifth conditions.

The storage 90 may be implemented by at least one of Nonvolatile memory devices such as cache, Read Only Memory (ROM), Programmable ROM (PROM), Erasable Programmable ROM (EPROM), Electrically Erasable Programmable ROM (EEPROM), and Flash memory, or Volatile memory devices such as random access memory (RAM), or Storage media such as hard disk drive (HDD, Hard Disk Drive), CD-ROM, but is not limited thereto. The storage 90 may be a memory implemented as a separate chip from the processor described above with respect to the controller 100, or may be implemented as a processor and a single chip.

The alarm unit 70 may transmit a warning signal according to a control signal of the controller 100. Specifically, the alarm unit 70 may include a display, a speaker, and a vibrating body provided in the vehicle 1, and output a display, sound, and vibration that can warn the driver of a collision risk according to a control signal from the controller 100.

The controller 100 may include at least one memory in which a program for performing an operation described below is stored and at least one processor for executing the stored program. In the case of a plurality of memories and processors, they may be integrated on one chip or may be provided in physically separate locations. In addition, the controller 100 may be a computer such as a CPU or an electronic control unit (ECU).

Figure 3:
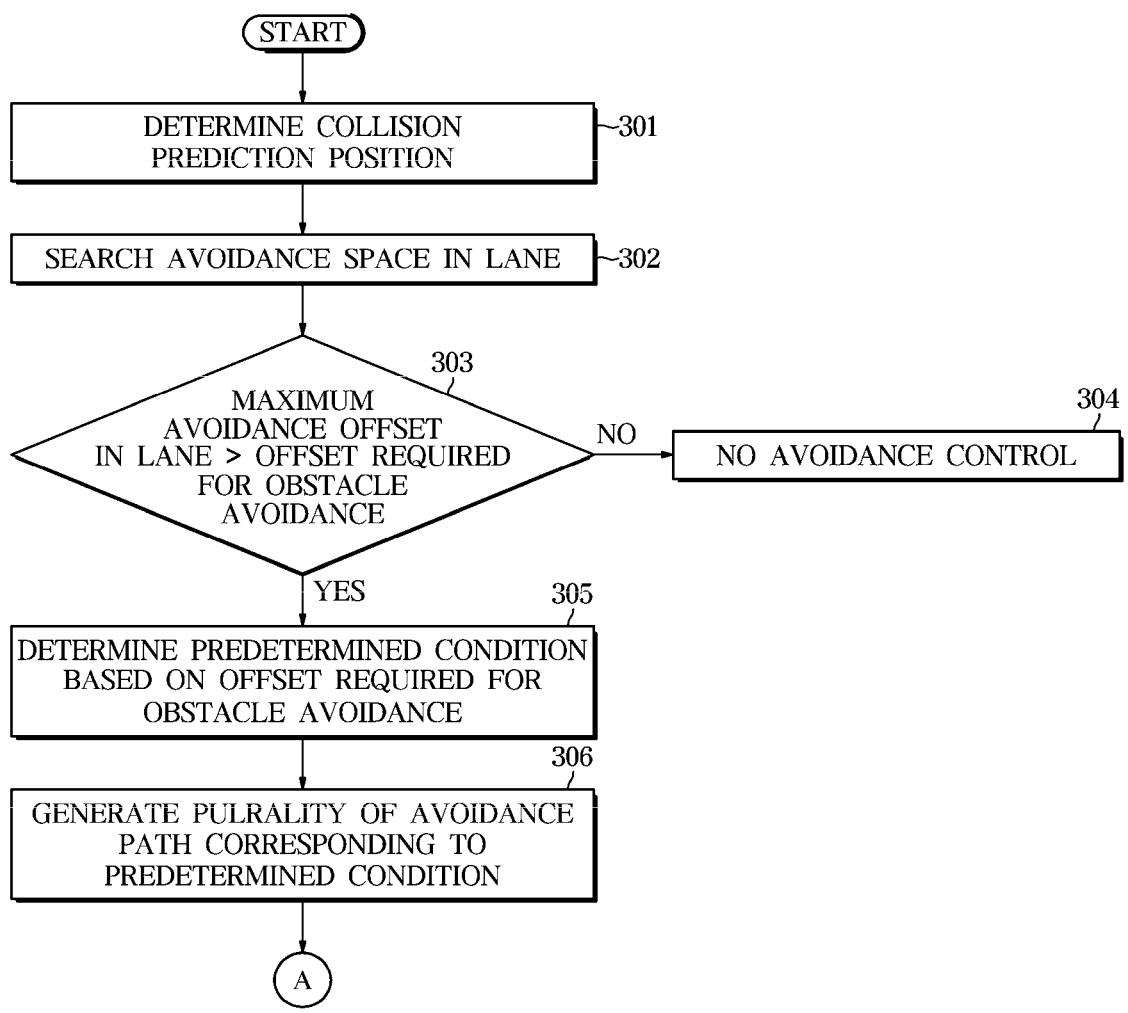
FIGS. 3 and 4 are flowcharts illustrating a method of controlling a vehicle according to an exemplary embodiment of the present disclosure.
Figure 4:
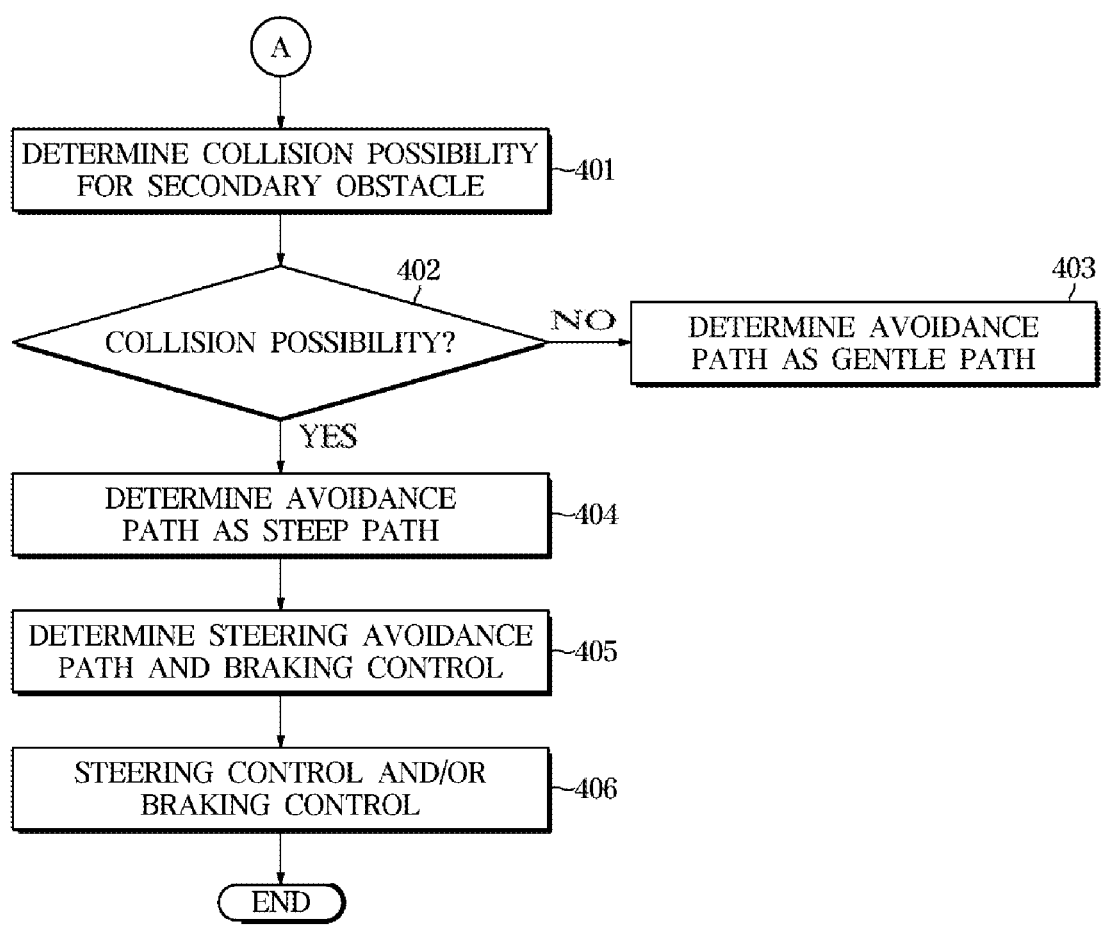

FIGS. 3 and 4 are flowcharts illustrating a method of controlling a vehicle according to an exemplary embodiment of the present disclosure.

Figure 5:
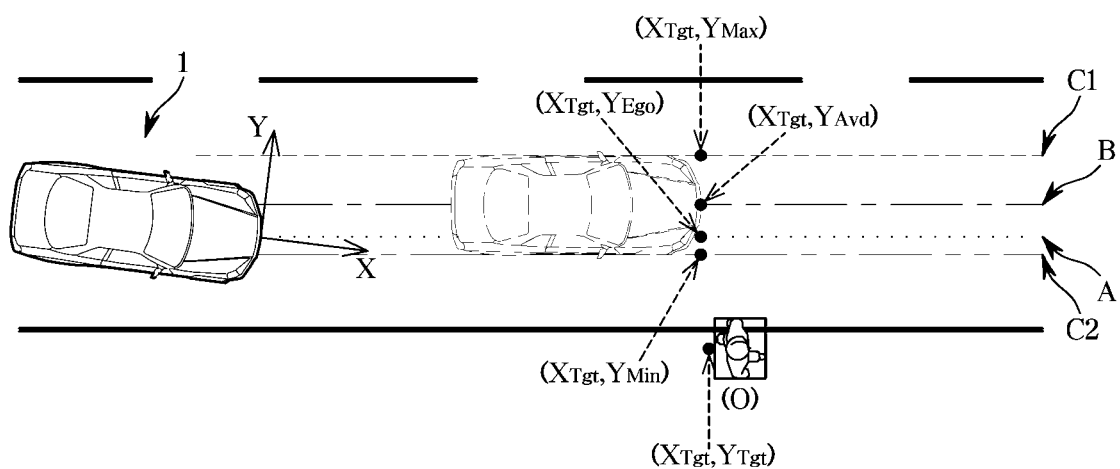
FIGS. 5 to 10 are diagrams for explaining determination of a lateral offset and a vertical position of a primary obstacle.

Referring to FIG. 3 as well as FIG. 5, the controller 100 determines a predicted position of a collision with an obstacle (301). The controller 100 may determine the position of a reference line B for obstacle avoidance by determining the collision prediction position.

The controller 100 searches for an avoidance space in the lane (302). The controller 100 may determine the positions of the maximum movement reference lines C1 and C2 by searching for the avoidance space.

The controller 100 regards the avoidance control through the steering control as inappropriate, and does not perform the avoidance control (304) when the maximum avoidable offset in the lane (the difference between the maximum movement reference line and the own vehicle reference line) is less than the offset required for obstacle avoidance (the difference between the avoidance reference line and the own vehicle reference line) (303).

When the avoidable offset in the lane is greater than the offset required for obstacle avoidance, the controller 100 regards it as possible to control the avoidance by steering, and determines a predetermined condition based on the offset required for obstacle avoidance (305). In this case, the offset required for obstacle avoidance may be a reference line B for obstacle avoidance. Further, the predetermined condition may be an equation described in FIGS. 5 to 10 to be described later.

The controller 100 generates a plurality of avoidance paths corresponding to a predetermined condition (306). The plurality of avoidance paths may be divided into a gentle avoidance path and an abrupt avoidance path according to a predetermined condition. The controller 100 may control the steering angle adjustment unit of the vehicle 1 to follow any one of a plurality of avoidance paths. A description of generating the avoidance path will be described later.

According to an embodiment, the controller 100 determines a collision predicted position between the vehicle 1 and the obstacle, and determines an avoidance position capable of avoiding a collision with the obstacle based on the collision predicted position. In this case, the avoidance position may be a reference line B for obstacle avoidance. The controller 100 may generate a plurality of avoidance paths corresponding to a predetermined condition based on the avoidance position and control the steering angle adjuster to follow any one of the plurality of avoidance paths. In addition, the controller 100 may calculate a target position at which tracking of the avoidance path is terminated based on a predetermined condition and may calculate a plurality of avoidance paths based on the target position. In this case, a predetermined condition and an equation for a plurality of avoidance paths may be stored in the storage 90.

The plurality of avoidance paths include two paths. One is a path that the vehicle's longitudinal position is greater than the obstruction's longitudinal position, and having a gentle curvature. The other is a path that the longitudinal position of the vehicle is the same as the longitudinal position of the obstacle, and having a sharp curvature.

According to an embodiment, the rear side detection sensor 202 may be installed on both the left and right sides of the vehicle 1 in order to be able to recognize an object from the both the direction between the right side and the rear side of the vehicle 1 (hereinafter, right and rear side), and the direction between the left side and rear side of the vehicle 1 (hereinafter, left and rear side). For example, with reference to FIG. 1, a first rear side detection sensor 202a or a second rear side detection sensor 202b is provided on the left side of the vehicle 1, and a third rear side detection sensor 202c or a fourth rear side detection sensor 202d may be provided on the right side of the vehicle 1.

The detection sensor 200 may also include a right side detection sensor 203 and a left side detection sensor 204 for detecting obstacles approaching in the right and left directions of the vehicle 1. The right side detection sensor 203 may include a first right side detection sensor 203a and a second right side detection sensor 203b to detect all obstacles in the right side of the vehicle 1. The left side detection sensor 204 may also include the first left side detection sensor 204a and the second left side detection sensor 204b to detect all obstacles in the left side of the vehicle 1.

The detection sensor 200 may be implemented using various devices, for example, a radar using millimeter wave or microwave, a Light Detection And Ranging (LiDAR) using pulsed laser light, a vision sensor using visible light, an infrared sensor using infrared, or an ultrasonic wave using ultrasonic waves. The detection sensor 200 may be implemented using only one of these, or may be implemented by combining them. When a plurality of detection sensors 200 are provided in the vehicle 1, each detection sensor 200 may be implemented using the same device or may be implemented using different devices. In addition, the detection sensor 200 can be implemented using various devices and combinations that the designer can consider.

In addition, the lane detector 230 may be provided at a location where the plurality of detection sensors 200 are provided. As an example, the lane detector 230 may be provided in a location where a first detection sensor 201a is located to detect a lane of a lane in which the vehicle 1 is running.

That is, the lane detector 230 is implemented as an image sensor such as a camera and mounted in the front of the vehicle 1, and can photograph the surrounding environment in the direction (front) that the vehicle is traveling. In the photographed image acquired from lane detector 230, information on how far the vehicle 1 is from the lane, information on how curved the lane or road is, and information on how far the direction of the vehicle 1 is from the lane, etc. are included.

Referring to FIG. 4, the controller 100 determines a possibility of a collision with a secondary obstacle while driving the avoidance path before or after generating the avoidance path for avoiding the obstacle (401). In this case, the secondary obstacle indicates an obstacle for which a subsequent collision is expected in time.

If there is no risk of collision with an obstacle, the controller 100 determines a first avoidance path as a path having a gentle curvature among the plurality of avoidance paths (403), and controls the steering angle adjustment unit to follow the gentle path in the first section when the absence of obstacles and risk of collision.

In this case, the avoidance path may include a first avoidance path for a first section with a primary obstacle and a second avoidance path for a second section with a secondary obstacle. The second avoidance path may be generated based on an offset, a heading angle, and a curvature of the first avoidance path, and the first avoidance path may be determined based on a probability of collision with an obstacle in the second section.

The controller 100 determines an avoidance path among a gentle path or a steep path (404), and determines a steering avoidance path and braking control after avoiding the first obstacle (405) when there is a possibility of collision with a secondary obstacle, The controller 100 performs steering control and/or braking control in order to avoid the secondary obstacle after the tracking of the avoidance path for avoiding the first obstacle is finished (406).

FIGS. 5 to 10 are diagrams for explaining determination of a lateral offset and a vertical position of a primary obstacle. In FIGS. 5 to 10, the x-axis indicates the longitudinal direction and the y-axis indicates the transverse direction.

First, various reference lines referred to in the disclosed embodiments will be described. Referring to FIG. 5, the own vehicle reference line A passes through the center of the front bumper of the vehicle 1 and indicates a reference line parallel to the lane. The reference line B for obstacle avoidance passes through a position for avoiding the obstacle O and indicates a reference line parallel to the lane. The maximum movement reference lines C1 and C2 are located inward by half the width of the vehicle 1 and the safety width of the vehicle 1 from the lane in the avoidance direction or the opposite direction to the obstacle O, and indicate a reference line parallel to the lane.

The horizontal position of the reference line B for obstacle avoidance may be determined by Equation 1 below.

$$y_{Avd} = y_{Tgt} + 0.5(w_{ego} + w_{Tgt}), \text{ for left avoidance} \quad \text{[Equation 1]}$$

$$y_{Avd} = y_{Tgt} - 0.5(w_{ego} + w_{Tgt}), \text{ for right avoidance}$$

($w_{ego}$: width of vehicle 1, $w_{Tgt}$: width of obstacle 0)

Figure 6:
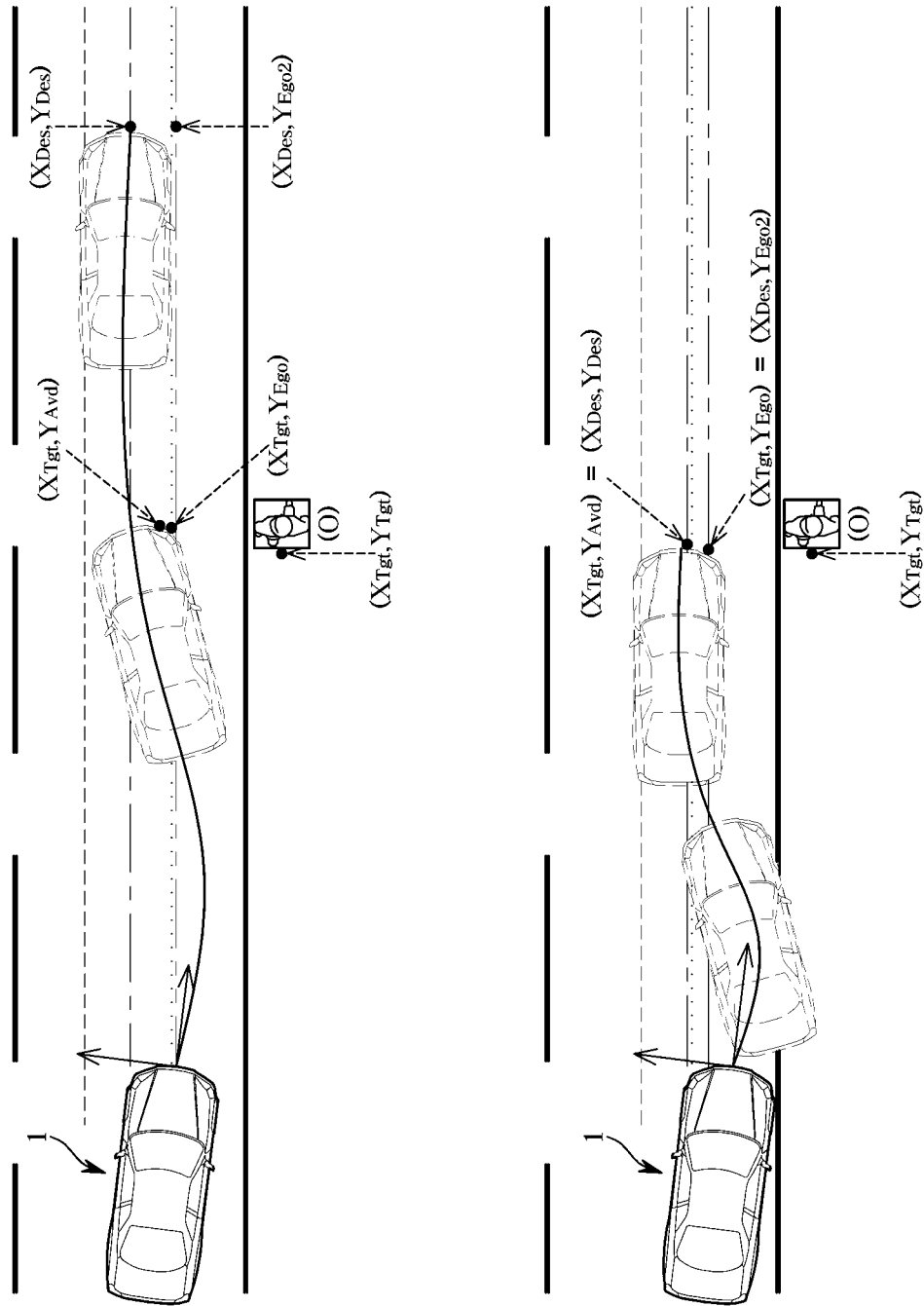

Further, referring to FIG. 6, the reference line of the avoidance path indicates a reference line parallel to the lane after the collision avoidance path ends, passes through the center of the front bumper of the vehicle 1. For example, in FIG. 6, the avoidance path reference line indicates the reference line passing through ($x_{Des}$, $y_{Des}$), and the value $x_{Des}$ may vary depending on whether the collision avoidance path of the vehicle 1 is steep or gentle. The $y_{Des}$ value is a position having an offset equal to $y_{Desoffset}$ from the reference line of the own vehicle (see A, FIG. 5) at the position of the $x_{Des}$ value may use a relationship of $y_{Avd}-y_{Ego}$ or $y_{max}-y_{Ego}$ or $y_{min}-y_{Ego}$, which is an offset between the own vehicle reference line A and another reference line.

The controller 100 generates a plurality of avoidance paths for avoiding the obstacle O. At this time, the plurality of avoidance paths are generated based on the position ($x_{Des}$, $y_{Des}$) of the first avoidance path (top of FIG. 6), which is the gentlest avoidance path, and the target position ($x_{Des}$, $y_{Des}$) of the second avoidance path (bottom of FIG. 6), which is the steepest avoidance path.

The first avoidance path and the second avoidance path may be generated based on various conditions.

FIG. 6 shows a first avoidance path and a second avoidance path according to the first condition. The first condition is ($y_{max}-y_{Ego}$)≥2 ($y_{Avd}-y_{Ego}$) (refer to FIG. 5), and is based on a comparison between the own vehicle reference line A, the maximum movement reference line C1, and the reference line B for obstacle avoidance.

In this case, the target position corresponding to the first avoidance path is ($x_{Des}$, $y_{Des}$)=($x_{Des}$, $y_{Desoffset}+y_{Ego2}$)=($2x_{Tgt}$, $2(y_{Avd}-y_{Ego})+y_{Ego2}$), and the target position corresponding to the second avoidance path is ($x_{Des}$, $y_{Des}$)=($x_{Des}$, $y_{Desoffset}+y_{Ego2}$)=($x_{Tgt}$, ($y_{Avd}-y_{Ego})+y_{Ego2}$).

Figure 7:
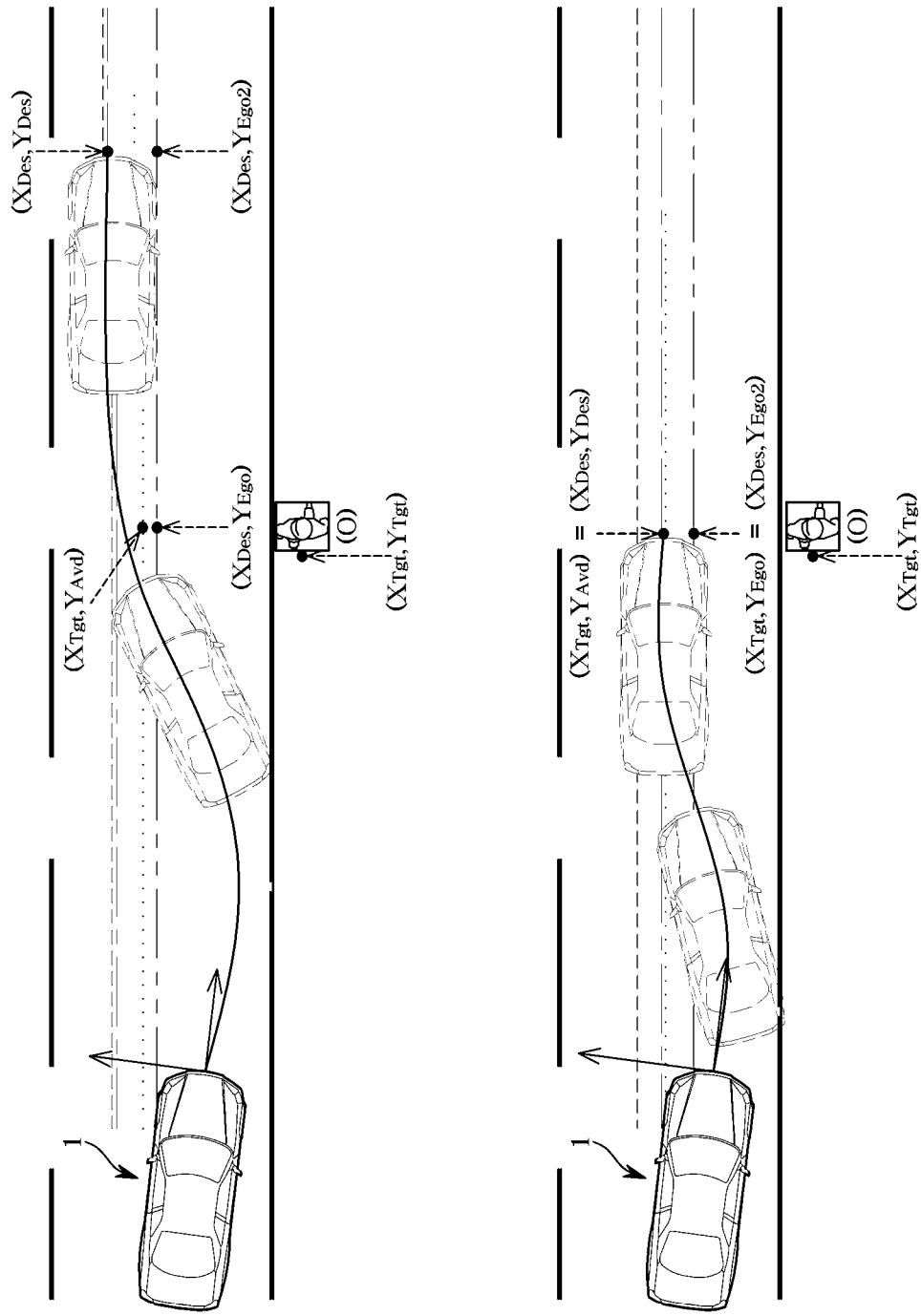

FIG. 7 shows a first avoidance path and a second avoidance path according to the second condition. The second condition is $2(y_{Avd}-y_{Ego})>(y_{max}-y_{Ego})≥(y_{Avd}-y_{Ego})>(y_{min}-y_{Ego})$. In this case, if the existing double offset is used, there is a possibility of departure from the lane, and the moved path is calculated as much as the maximum lateral movement amount within the lane.

In this case, the target position corresponding to the first avoidance path is $$(x_{Des}, y_{Des}) = (x_{Des}, y_{Desoffset} + y_{Ego2}) = \left( \frac{(y_{Max} - y_{Ego})}{(y_{Avd} - y_{Ego})} x_{Tgt}, \frac{(y_{Max} - y_{Ego})}{(y_{Avd} - y_{Ego})}(y_{Avd} - y_{Ego}) + y_{Ego2} \right),$$

and the target position corresponding to the second avoidance path is ($x_{Des}$, $y_{Des}$)=($x_{Des}$, $y_{Desoffset}+y_{Ego2}$)=($x_{Tgt}$, ($y_{Avd}-y_{Ego})+y_{Ego2}$).

Figure 8:
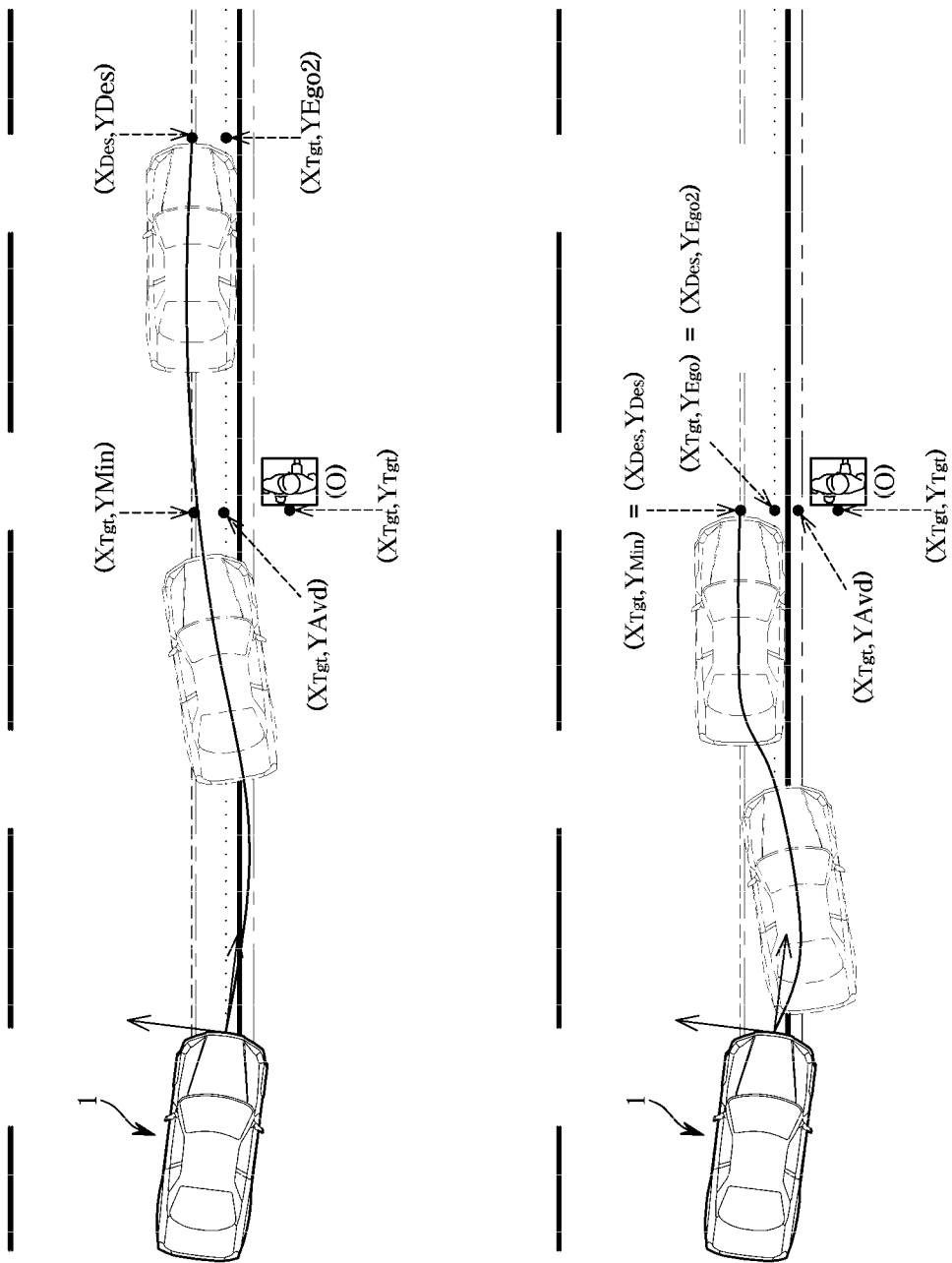

FIG. 8 shows a first avoidance path and a second avoidance path according to a third condition. The third condition is {($y_{min}-y_{Ego}$)≥($y_{Avd}-y_{Ego}$)}&$x_{Tgt}$>0. In this case, there is a margin on the lane than the second condition.

In this case, the target position corresponding to the first avoidance path is ($x_{Des}$, $y_{Des}$)=($x_{Des}$, $y_{Desoffset}+y_{Ego2}$)=($2x_{Tgt}$, ($y_{Min}-y_{Ego})+y_{Ego2}$), and the target position corresponding to the second avoidance path is ($x_{Des}$, $y_{Des}$)=($x_{Des}$, $y_{Desoffset}+y_{Ego2}$)=($x_{Tgt}$, ($y_{Min}-y_{Ego})+y_{Ego2}$).

Figure 9:
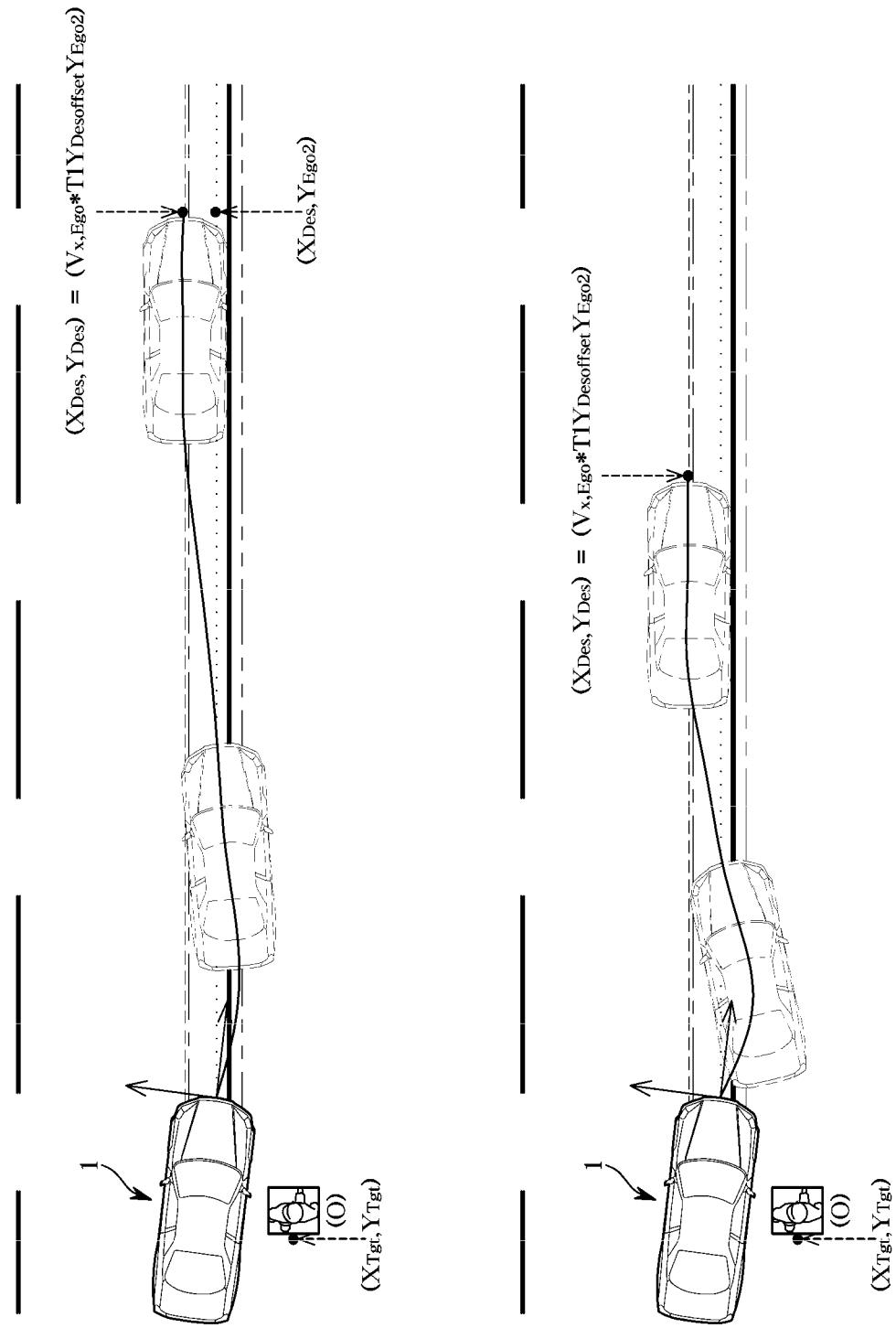

FIG. 9 shows a first avoidance path and a second avoidance path according to the fourth condition. At this time, the fourth condition is {($y_{min}-y_{Ego}$)≥($y_{Avd}-y_{Ego}$)}&$x_{Tgt}$≤0. Here, the fourth-order function, which is also known as a quartic function, has been implemented.

In this case, the target position corresponding to the first avoidance path ($x_{Des}$, $y_{Des}$)=($x_{Des}$, $y_{Desoffset}+y_{Ego2}$)=($v_{x,Ego}*\tau_1$, ($y_{Min}-y_{Ego})+y_{Ego2}$), and the target position corresponding to the second avoidance path is ($x_{Des}$, $y_{Des}$)=($x_{Des}$, $y_{Desoffset}+y_{Ego2}$)=($v_{x,Ego}*\tau_2$, ($y_{Min}-y_{Ego})+y_{Ego2}$).

However, it is $\tau_1>\tau_2$, and both are subject to a time gap within the maximum operating time of the system.

Figure 10:
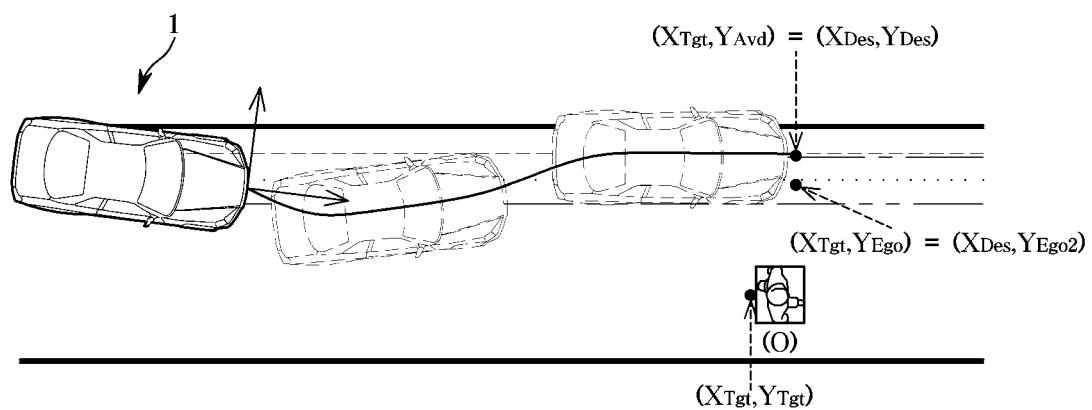

FIG. 10 shows a first avoidance path and a second avoidance path according to the fifth condition. The fifth condition is ($y_{Avd}-y_{Ego}$)>($y_{max}-y_{Ego}$). In this case, steering avoidance is impossible due to insufficient evasion space in the lane. Accordingly, the controller 100 may perform braking control without performing steering avoidance. Here, the fifth-order function, which is also known as a quantic function, has been implemented.

According to an embodiment, the controller 100 may control not to follow a plurality of avoidance paths, and may perform braking control so as not to collide with an obstacle when the width of the vehicle's front bumper is greater than the distance between the obstacle and each lane on both sides.

Figure 11:
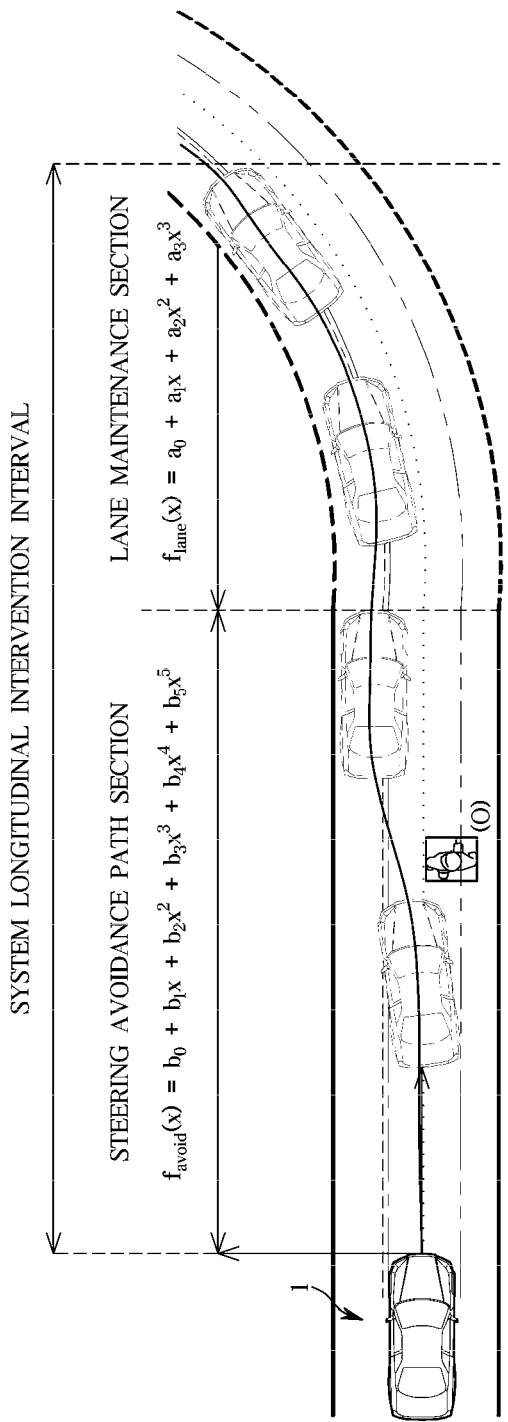
FIG. 11 illustrates the generated collision avoidance path.

FIG. 11 shows the generated avoidance path. The controller 100 uses the yaw speed of the vehicle 1 and the lane information (a coefficient of a cubic function) to connect the current position $$\left(X_0 = [y_0, \psi_0, \gamma_0] = \left[0, 0, \frac{a_{y,ego}}{v_{x,ego}^2}\right]\right)$$

and the target position $(x_{fin}=[y_{fin}, \psi_{fin}, y_{fin}]=[f_{lane}(x_{fin}), f_{lane}(x_{fin}), f_{lane}(x_{fin})]$, of the vehicle 1, and calculates a function 5th order, which is a smooth path to the lane. The controller 100 may calculate the heading angle (quaternary function) and curvature (third order function) of the avoidance path by differentiating the fifth-order function, and thus predict the offset, heading angle, and curvature demand of the entire avoidance path. In this regard, Equation 2 below may be referred to.

$$\begin{bmatrix} x_{fin}^3 & x_{fin}^4 & x_{fin}^5 \\ 3x_{fin}^2 & 4x_{fin}^3 & 5x_{fin}^4 \\ 6x_{fin} & 12x_{fin}^2 & 20x_{fin}^3 \end{bmatrix} \begin{bmatrix} b_3 \\ b_4 \\ b_5 \end{bmatrix} =$$

$$\begin{bmatrix} y_{des} + a_0 + a_1 x_{fin} + a_2 x_{fin}^2 + a_3 x_{fin}^3 - \left(b_0 + b_1 x_{fin} + b_2 x_{fin}^2\right) \\ a_1 + 2a_2 x_{fin} + 3a_3 x_{fin}^2 - (b_1 + 2b_2 x_{fin}) \\ 2a_2 + 6a_3 x_{fin} - (2b_2) \end{bmatrix}$$

The controller 100 may predict a path based on lane information (a third order function) from the end of the avoidance path to the final control end point (lane maintenance section).

Figure 12:
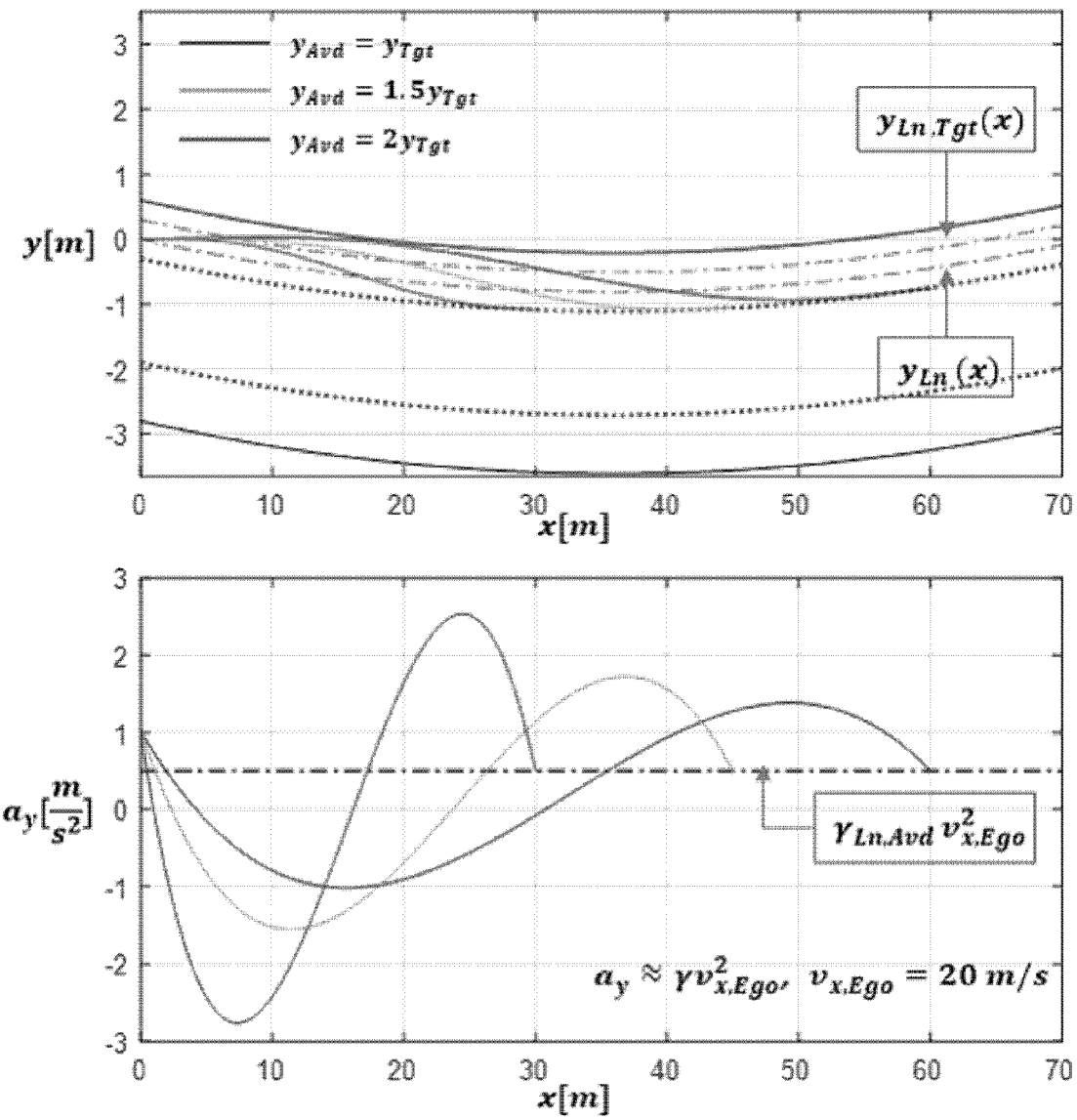
FIGS. 12 and 13 show examples of collision avoidance paths.
Figure 13:
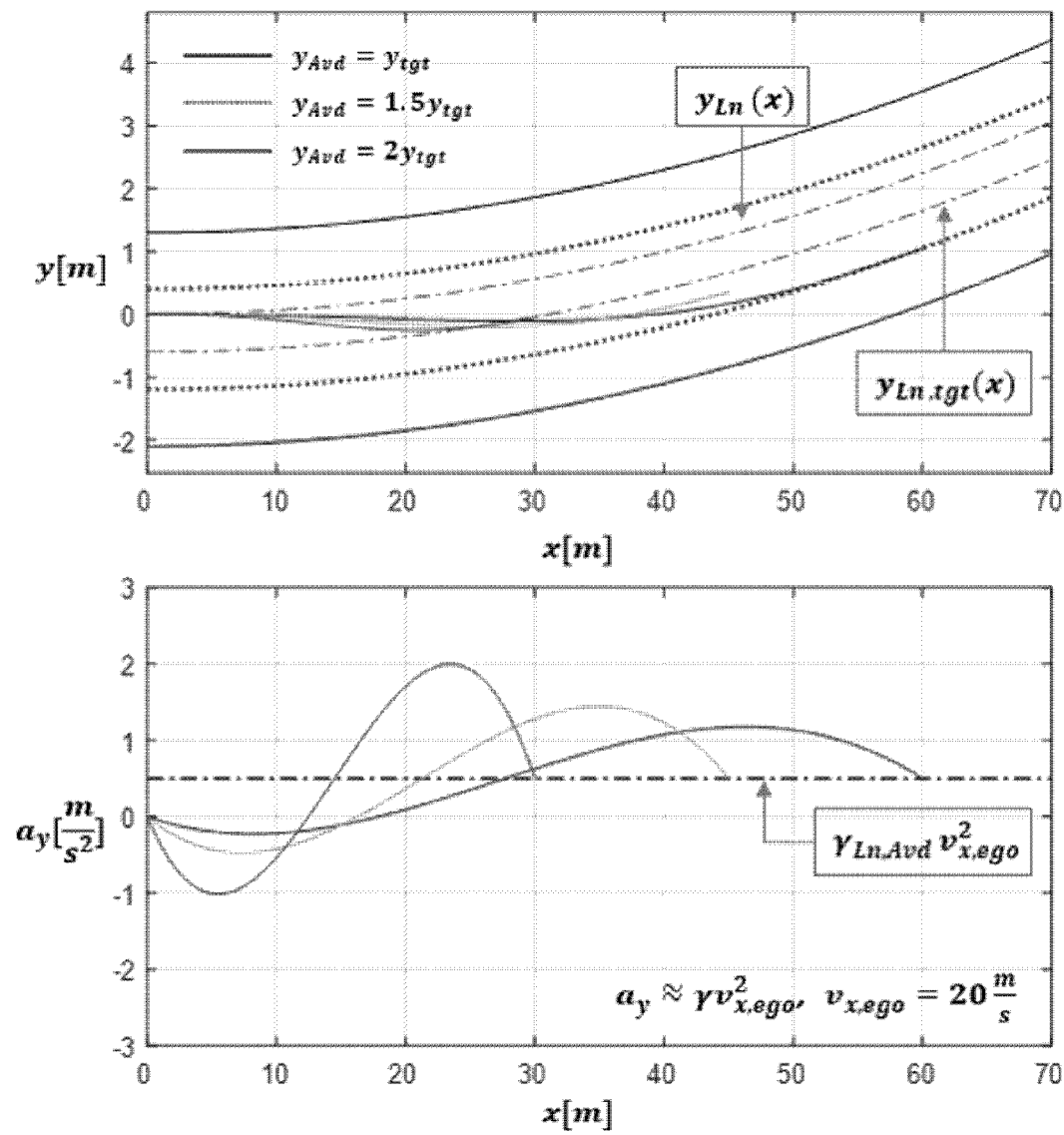

FIGS. 12 and 13 show examples of collision avoidance paths.

FIGS. 14 to 18 are diagrams for explaining selection of an avoidance path and an intervention decision for a secondary obstacle.

According to the present disclosure, the vehicle 1 can avoid the obstacle O by the avoidance path and avoid the secondary obstacle based on the avoidance path created immediately before reaching the target position.

Figure 14:
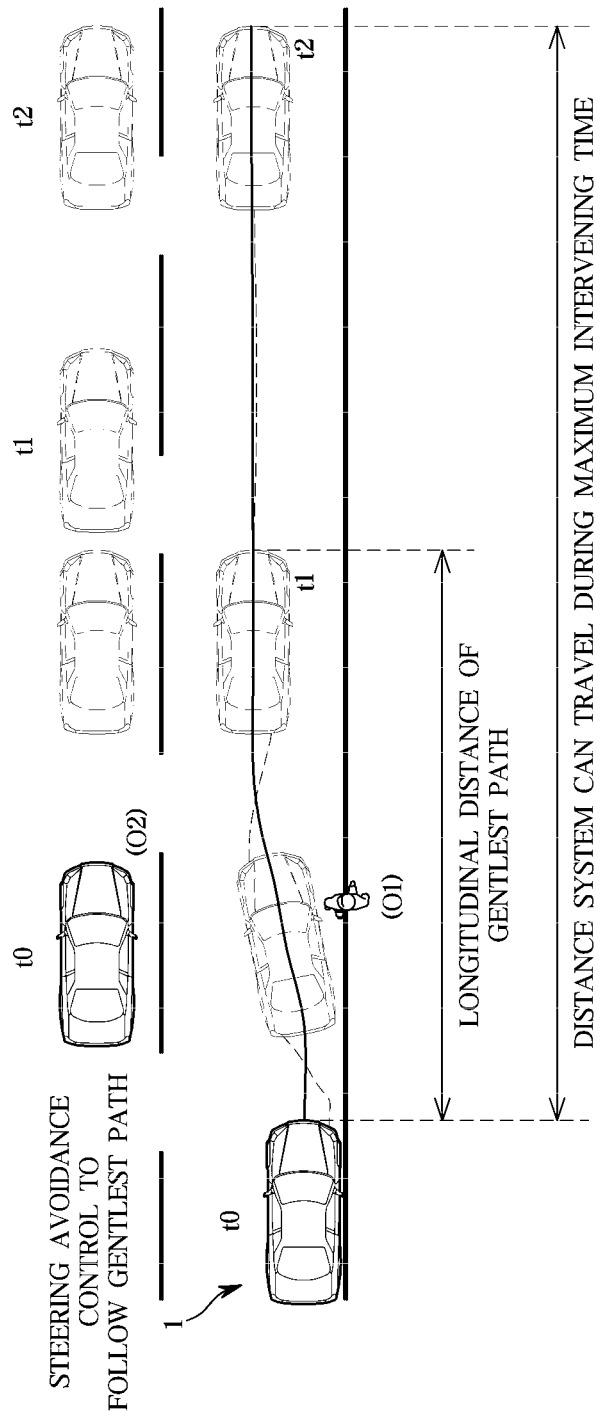
FIGS. 14 to 18 are diagrams for explaining selection of an avoidance path and an intervention decision for a secondary obstacle.

Referring to FIG. 14, when there is no risk of a secondary collision, the controller 100 may perform steering avoidance control to follow the gentlest path among paths within a range in which the system can be intervened at a current time point to.

Figure 15:
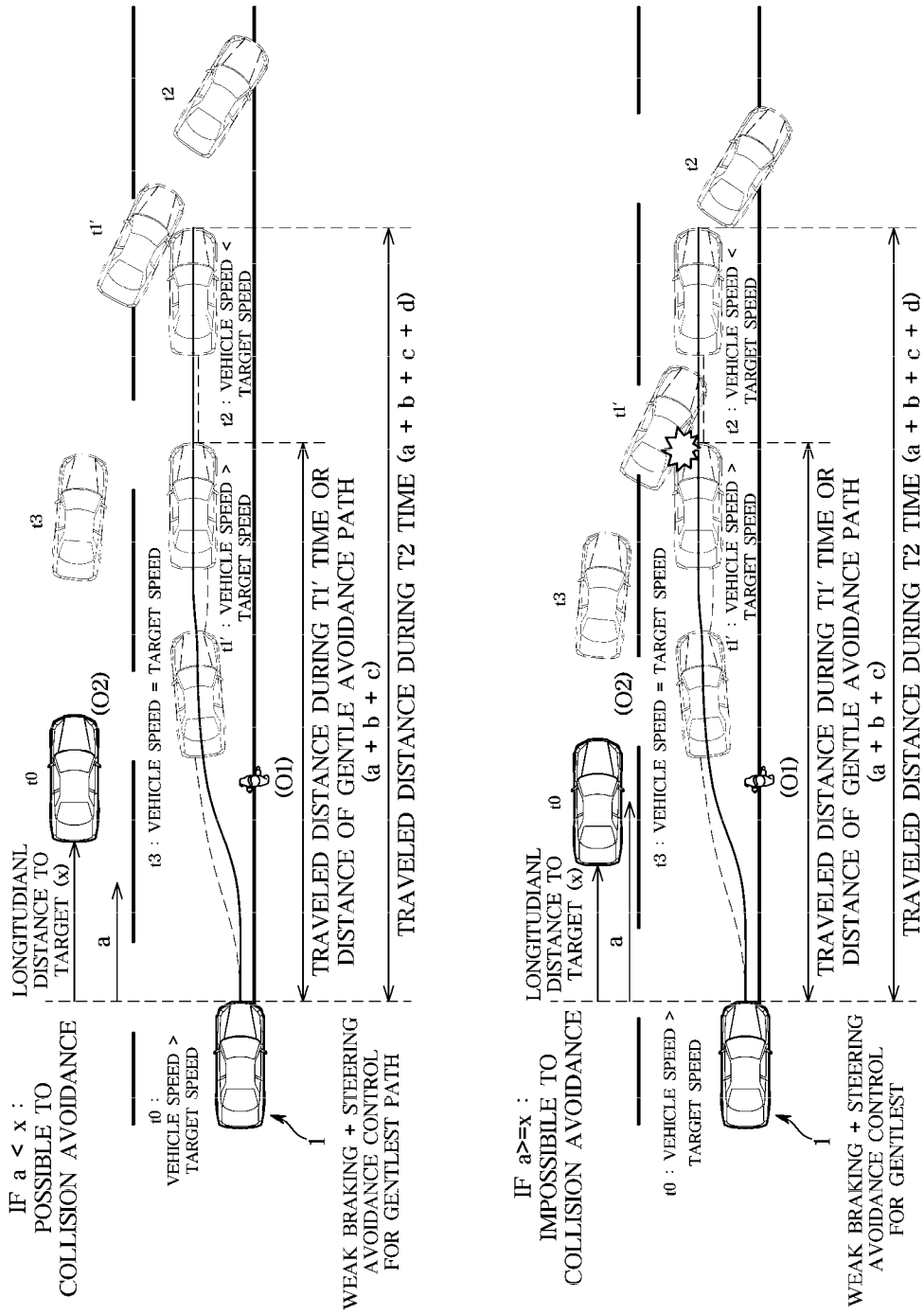

Referring to FIG. 15, the controller 100 determines whether there is a time point $$\left(t3, t_3 = -\frac{v_{x,rel}}{a_{rel}}\right),$$

at which the speed (or position) of the vehicle 1 and the speed (or position) of the secondary obstacle O2 are the same, to follow a gentle path through braking control and steering control when there is a risk of a secondary collision with a secondary obstacle (O2) before within the system intervention time (t2). In other words, the controller 100 may determine whether collision with the secondary obstacle O2 can be avoided before the smooth avoidance path ends.

Figure 16:
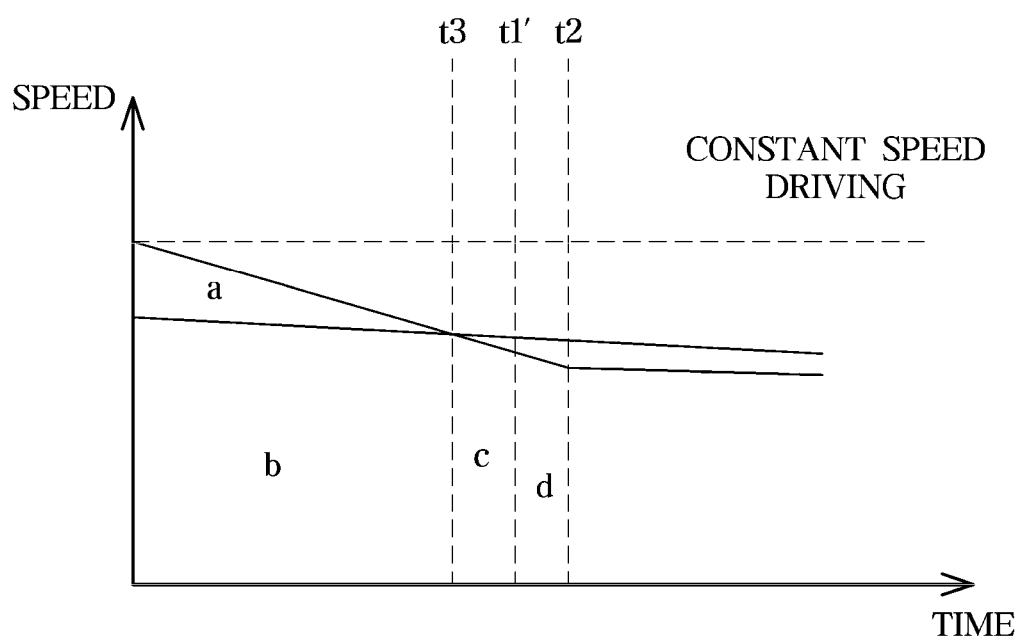

According to an embodiment, the controller 100 controls to follow a gentle path through braking control and steering control when t3<t1' and the difference in the amount of movement (a, $a=v_{x,rel}t_3+0.5a_{x,rel}t_3^2$) between the vehicle 1 and the secondary obstacle O2 is less than the longitudinal distance x between the vehicle 1 and the first obstacle O1. Refer to FIG. 16 for the relationship to the speed of each time refers FIG. 15. Here, t1'=time to reach a gentle path by braking control and steering control, t2=maximum operating time of the system, t3=time when the speed of the vehicle 1 and the speed of the secondary obstacle (O2) become the same, a=minimum relative distance to the secondary obstacle (O2) required for collision avoidance, b=the distance the secondary obstacle (O2) moves to the point of collision avoidance, a+b=the distance the vehicle 1 moves to the point of collision avoidance, a+b+c=distance of the gentle collision avoidance path, and a+b+c+d=distance traveled by vehicle 1 up to the maximum operating time of the system.

Figure 17:
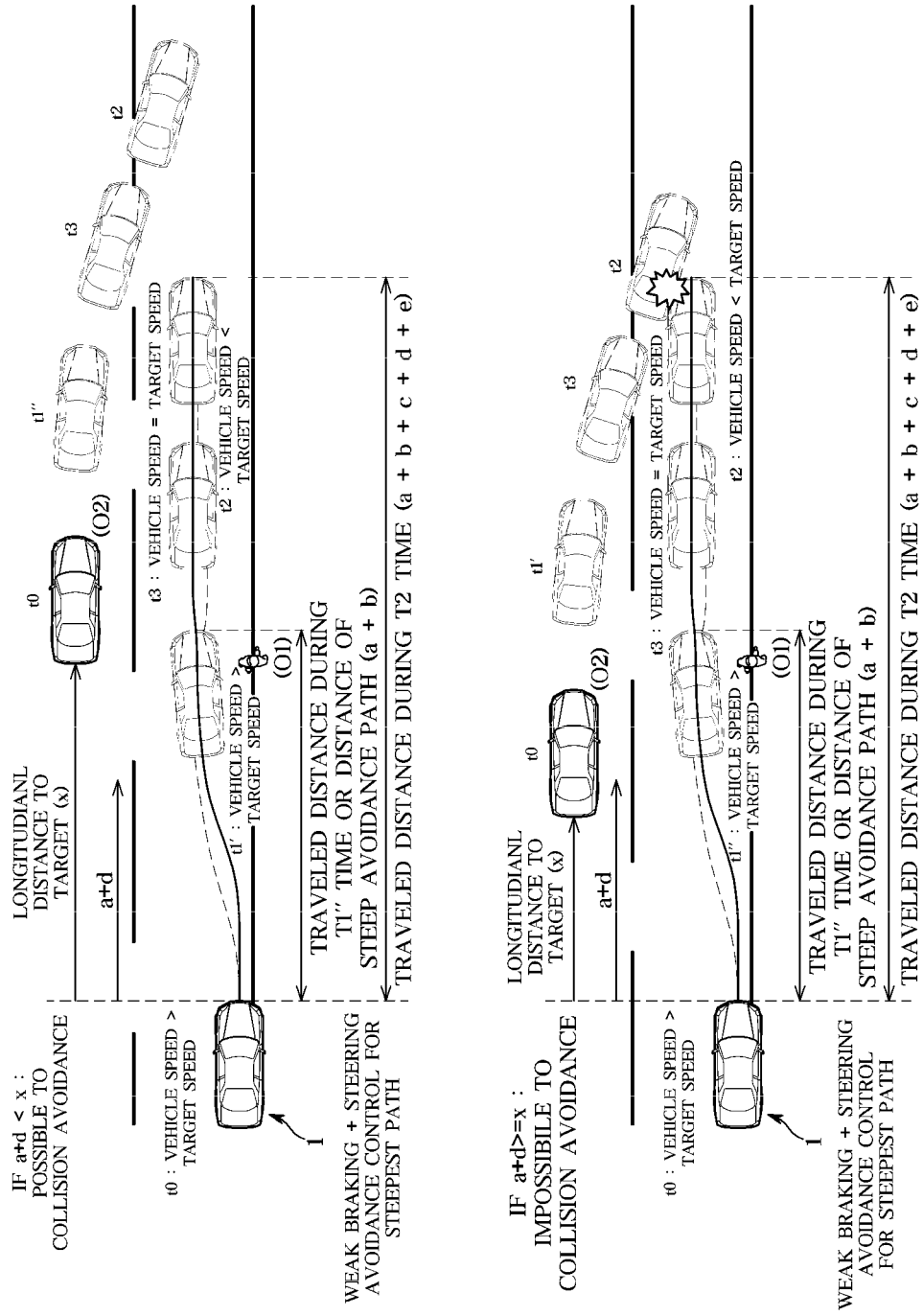

Referring to FIG. 17, the controller 100 determines whether there is a time point t3 at which the speed (or position) of the vehicle 1 and the speed of the secondary obstacle O2 are the same within the time (t1') required to follow a gentle path with braking control and steering control when there is a risk of a secondary collision with a secondary obstacle (O2) within the system intervention time (t2). In other words, the controller 100 may determine whether it is possible to avoid collision with the secondary obstacle O2 before the end of the steep avoidance path.

According to an embodiment, the controller 100 determines whether there is a time point t3 at which the speed of the vehicle 1 and the speed of the second obstacle O2 become the same before the system termination time t2 if t3>t1', when the maximum braking is used after the time $$\left(t1'', t_{1''} = \frac{1}{a_{des1}}\sqrt{2a_{des1}(a+b)+v_{x,Ego}^2} - \frac{v_{x,Ego}}{a_{des1}}\right)$$

required to follow the abrupt avoidance path with braking control and steering control. In other words, the controller 100 may determine whether a collision with the second obstacle O2 can be avoided using the braking control after the steep avoidance path is terminated.

According to an embodiment, the controller 100 follows a steep path through braking control and steering control if t1"<t3<t2 and when the difference in the amount of movement $$\left(a+d, a = v_{x,rel}t_{1''} + 0.5a_{x,rel}t_{1''}^2 \text{ and } d = -\frac{v_{x,rel,t_{1''}}^2}{2a_{rel2}}\right)$$

between the vehicle 1 and the secondary obstacle O2 is less than the longitudinal distance x between the vehicle 1 and the first obstacle O1. At this time, the maximum braking control is performed until the time point t2 after completion of the avoidance path tracking (t1").

Figure 18:
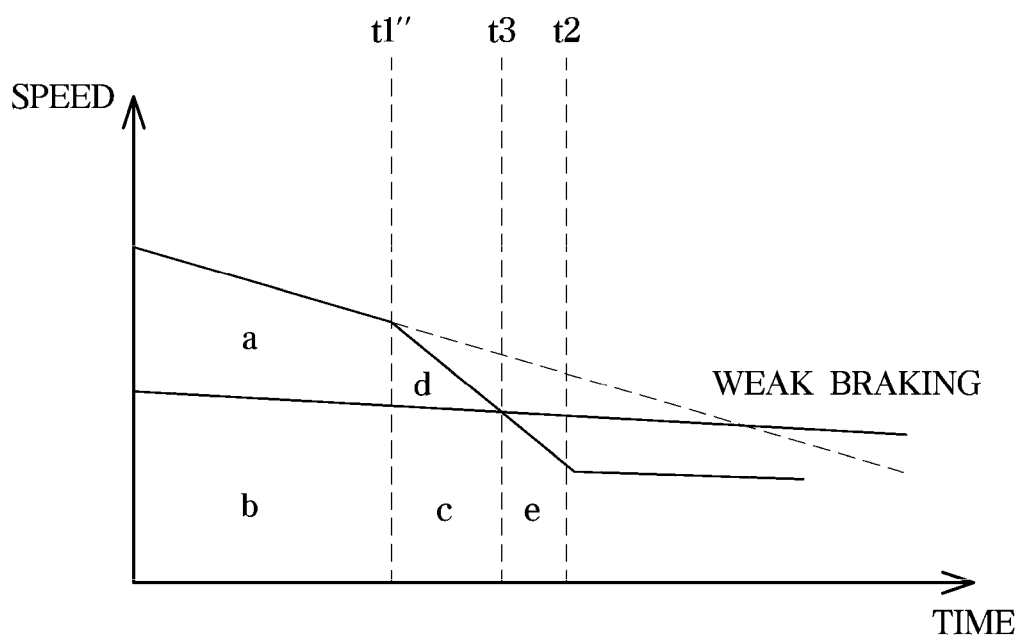

Refer to FIG. 18 for the relationship to the speed of each time according to FIG. 17. Here, t1"=time to reach an abrupt path by braking control and steering control, t2=maximum operating time of the system, t3=time when the speed of the vehicle 1 and the speed of the secondary obstacle (O2) become the same, a+b=distance of the sudden collision avoidance path, a+d=minimum relative distance between the vehicle 1 and the secondary obstacle (O2) for collision avoidance, b+c=distance traveled by the secondary obstacle (O2) to the point of collision avoidance, a+b+c+d=the distance the vehicle 1 has moved to the point of collision avoidance, and a+b+c+d+e=the distance traveled by the vehicle 1 to the maximum operating time of the system.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the present disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

According to an aspect of the disclosed embodiment, it is possible to respond to all collision risk situations existing in all directions of the own vehicle, and to naturally avoid obstacles.

What is claimed is:

1. A vehicle comprising:
   a detection sensor configured to acquire an image of a front view of the vehicle, and to detect an obstacle in the front view; and
   a controller including at least one processor configured to process data obtained from the detection sensor,
   wherein the controller is configured to:
      determine a predicted position of a collision between the vehicle and the obstacle,
      determine an avoidance position capable of avoiding a collision with the obstacle based on the predicted position,
      calculate a target position at which a tracking of each of a plurality of avoidance paths is ended after avoiding the obstacle, based on a predetermined condition based on the avoidance position,
      generate the plurality of avoidance paths including a first avoidance path and a second avoidance path with different curvatures, based on the target position, and
      control a steering angle adjustment unit to follow any one of the first avoidance path or the second avoidance path until the target position is reached,
   wherein the controller is further configured to generate the plurality of avoidance paths including a path in which a longitudinal position of the vehicle is larger than a longitudinal position of the obstacle and a curvature is smooth, and a path in which the longitudinal position of the vehicle is the same as the longitudinal position of the obstacle and the curvature is sharp.

2. The vehicle according to claim 1, further comprising: a storage configured to store a plurality of predetermined conditions and the plurality of avoidance paths corresponding to the respective predetermined conditions.

3. The vehicle according to claim 1, wherein the controller is configured to control the plurality of avoidance paths not to follow when a width of a front bumper of the vehicle is greater than a distance between the obstacle and each of lanes on both sides of the obstacle.

4. The vehicle according to claim 3, wherein the controller is configured to perform braking control so as to not to collide with the obstacle.

5. The vehicle according to claim 1, wherein when the controller is configured to generate the plurality of avoidance paths using coefficients of a fifth-order function.

6. The vehicle according to claim 1, wherein the controller is configured to obtain an offset of the vehicle using a fifth-order function, obtain a heading angle of the vehicle using a fourth-order function obtained by differentiating a fifth-order function, and obtain a curvature of the avoidance paths using a cubic function obtained by differentiating the fourth-order function.

7. The vehicle according to claim 1, wherein the plurality of avoidance paths include the first avoidance path for a first section and the second avoidance path for a second section, and
   wherein the first avoidance path is a path for avoiding a first obstacle, and the second avoidance path is a path for avoiding a second obstacle after the first obstacle.

8. The vehicle according to claim 7, wherein the controller is configured to determine the first avoidance path as the smooth path, and control the steering angle adjustment unit to follow the smooth path in the first section when there is no risk of collision with the second obstacle.

9. The vehicle according to claim 7, wherein the controller is configured to perform at least one of braking control or steering control in the second avoidance path when there is a risk of collision with the second obstacle.

10. A method of controlling a vehicle, comprising:
    determining a collision prediction position between the vehicle and an obstacle;
    determining an avoidance position capable of avoiding a collision with the obstacle based on the collision prediction position;
    calculating a target position at which a tracking of each of a plurality of avoidance paths is ended after avoiding the obstacle, based on a predetermined condition based on the avoidance position;
    generating the plurality of avoidance paths, including a first avoidance path and a second avoidance path with different curvatures, based on the target position; and
    controlling the vehicle to follow any one of the first avoidance path or the second avoidance path until the target position is reached,
    wherein the generating the plurality of avoidance paths comprises generating the plurality of avoidance paths including a path in which a longitudinal position of the vehicle is larger than a longitudinal position of the obstacle and a curvature is smooth, and a path in which the longitudinal position of the vehicle is the same as the longitudinal position of the obstacle and the curvature is sharp.

11. The method according to claim 9, further comprising loading a plurality of predetermined conditions and the plurality of avoidance paths corresponding to the respective predetermined conditions from a storage.

12. The method according to claim 10, wherein controlling the vehicle comprises controlling the plurality of avoidance paths not to follow when a width of a front bumper of the vehicle is greater than a distance between the obstacle and each of lanes on both sides of the obstacle.

13. The method according to claim 12, wherein the controlling the vehicle comprises performing braking control so as to not to collide with the obstacle.

14. The method according to claim 10, wherein the generating the plurality of avoidance paths comprises generating the plurality of avoidance paths using coefficients of a fifth-order function.

15. The method according to claim 10, wherein the generating the plurality of avoidance paths comprises:
   obtaining an offset of the vehicle using a fifth-order function;
   obtaining a heading angle of the vehicle using a fourth-order function obtained by differentiating the fifth-order function; and
   obtaining a curvature of each of the plurality of avoidance paths using a cubic function obtained by differentiating the fourth-order function.

16. A non-transitory computer program stored on a recording medium, comprising steps of:
   determining a collision prediction position between a vehicle and an obstacle;
   determining an avoidance position capable of avoiding a collision with the obstacle based on the collision prediction position;
   calculating a target position at which a tracking of each of a plurality of avoidance paths is ended after avoiding the obstacle, based on a predetermined condition based on the avoidance position;
   generating the plurality of avoidance paths, including a first avoidance path and a second avoidance path with different curvatures, based on the target position;
   controlling the vehicle to follow any one of the first avoidance path or the second avoidance path until the target position is reached,
   wherein the generating the plurality of avoidance paths comprises generating the plurality of avoidance paths including a path in which a longitudinal position of the vehicle is larger than a longitudinal position of the obstacle and a curvature is smooth, and a path in which the longitudinal position of the vehicle is the same as the longitudinal position of the obstacle and the curvature is sharp.

* * * * *